Figure 2:
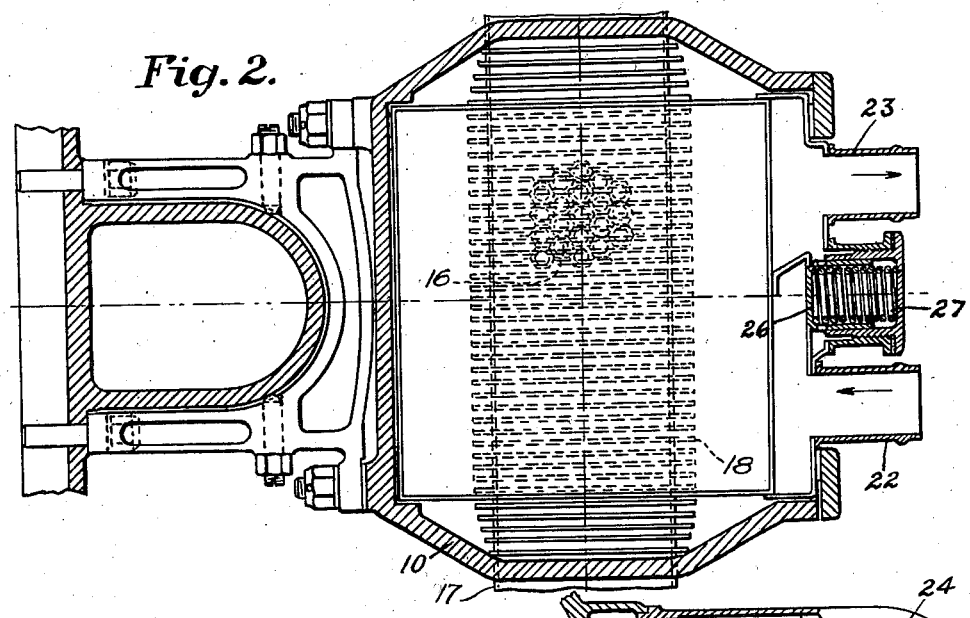

April 30, 1935.　　　　L. S. HOBBS　　　　1,999,237
LUBRICANT COOLING MEANS FOR INTERNAL COMBUSTION ENGINES
Filed Jan. 19, 1931　　　2 Sheets-Sheet 1

INVENTOR
Leonard S. Hobbs
BY
ATTORNEY

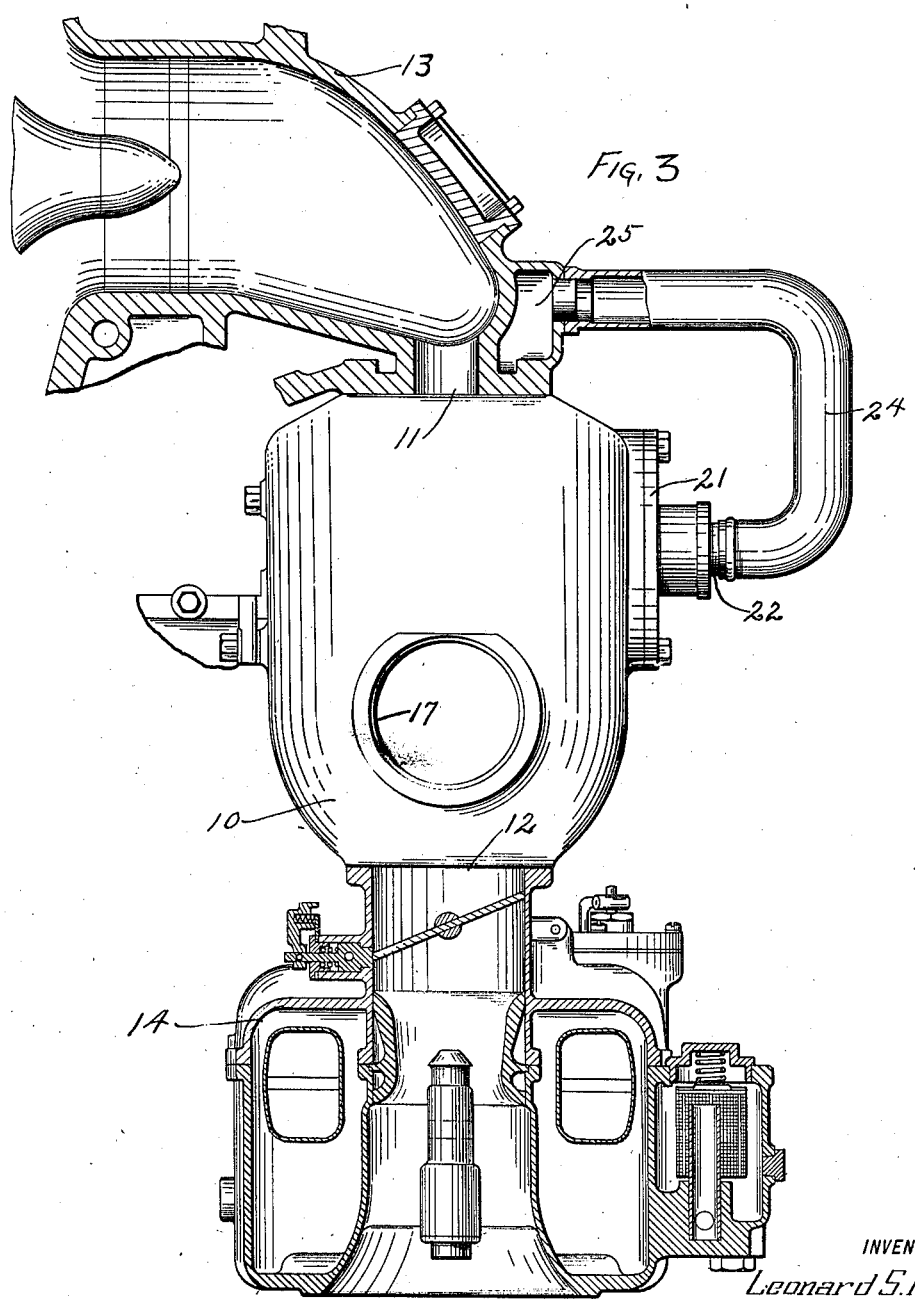

Patented Apr. 30, 1935

1,999,237

UNITED STATES PATENT OFFICE 1,999,237

LUBRICANT COOLING MEANS FOR INTERNAL COMBUSTION ENGINES

Leonard S. Hobbs, West Hartford, Conn., assignor to The Pratt & Whitney Aircraft Company, East Hartford, Conn., a corporation of Delaware Application January 19, 1931, Serial No. 509,569

4 Claims. (Cl. 123—196)

This invention relates to lubricant circulating and cooling devices and particularly to one for continuously circulating and cooling a supply of lubricant for an internal combustion engine.

An object of the invention is to provide cooling means for a large volume of circulating lubricant in an internal combustion engine, the heat of the lubricant being transmitted to the air or fuel mixture admitted to the intake passages of the engine so that the incoming air will be warmed and vaporization of the fuel within the engine facilitated.

Another object of the invention is to provide a lubricant cooling radiator within the air intake conduit of an internal combustion engine to permit heat transfer between the air or mixture entering the intake of the engine and the circulating lubricant within the radiator, the lubricant cooling area of the radiator being subjected to substantially all of the air or mixture entering the intake, the complete radiator unit being removable to facilitate repairs and replacement.

Another object of the invention is to provide means utilizing the latent heat of vaporization of a fuel mixture to effect cooling of a lubricant for the engine.

With these and other objects in view, my invention consists in the features of construction and operation set forth in the following specification and illustrated in he accompanying drawings.

In the accompanying drawings annexed hereto and forming a part of this specification, I have shown my invention adapted for a multi-cylinder internal combustion engine of the radial type, but it will be understood that the invention can be otherwise embodied and that the drawings are not to be construed as defining or limiting the scope of the invention, the claims appended to this specification being relied upon for that purpose.

Figure 1:
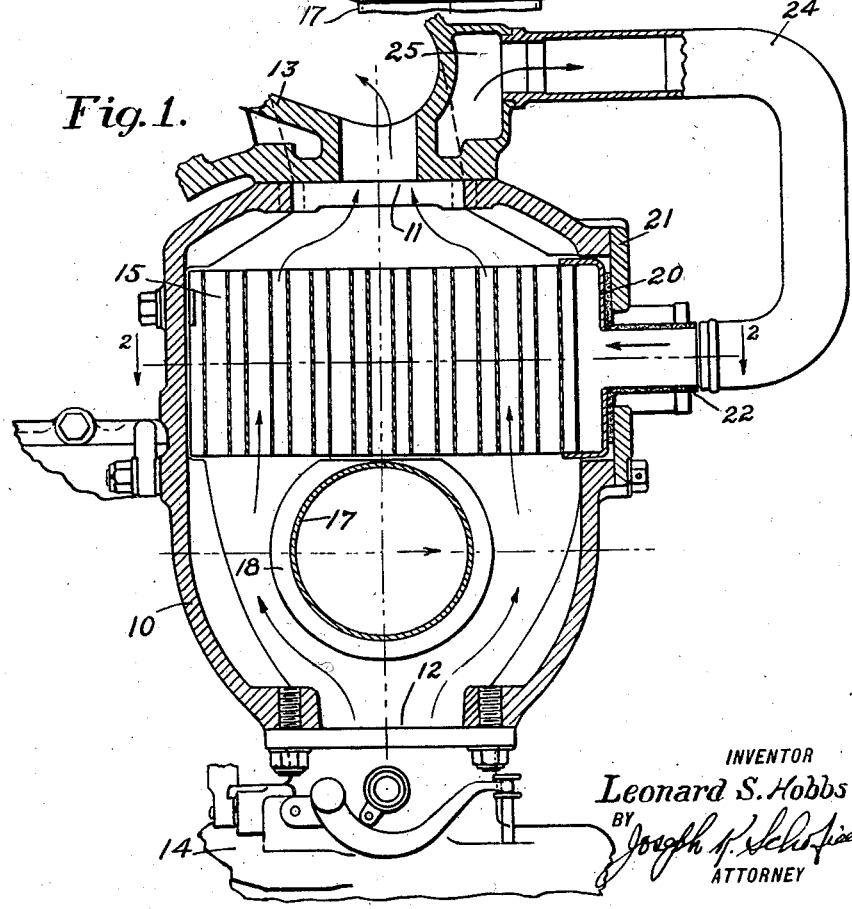

In the drawings:

Fig. 1 is a side elevation in section of a portion of the intake of an internal combustion engine provided with a preferred form of the present invention, Fig. 2 is a horizontal sectional view taken upon the line 2—2 of Fig. 1, and Fig. 3 is a general side view of portions of an engine showing the position of the radiator therein.

In the above mentioned drawings I have shown but one embodiment of the invention which is now deemed preferable, but it is to be understood that changes and modifications may be made within the scope of the appended claims without departing from the spirit of the invention.

In the operation of high speed and heavy duty engines, particularly aircraft types of internal combustion engines, it is desirable and usual to employ a pressure system for circulating lubricant to the various operative parts of the engine. As this lubricant comes into contact with such large areas of heated members, its temperature, during periods of continuous operation of an engine, becomes such that some cooling means are desirable. Also in the operation of internal combustion engines in extremely low temperatures, as in aeroplane operations at high altitudes, the incoming air should have its temperature increased to make the vaporization and combustion more complete. It is proposed therefore to utilize a large part of the heat of the lubricant circulated about the engine to warm the incoming cool air or fuel mixture including the air. Simultaneously this action cools the lubricant by its intimate association with the relatively cold incoming air and by the latent heat of vaporization of the fuel.

This heat transfer or interchange may preferably be accomplished by the introduction of a radiator directly within the intake. Operation of the engine at heavier loads will have a tendency to increase the temperature of the lubricant and will also induce a greater flow of air through the intake, thus increasing the cooling effect of this incoming air upon the lubricant and warming effect of the lubricant upon the air. With the engine running more lightly the cooling effect upon the lubricant is decreased by the reduced volume of incoming air, the lubricant temperature, however, will not be raised to the same extent as when the engine is operating under heavier duty, consequently requiring less cooling. The result is, therefore, that the radiator adjusts itself substantially automatically to different conditions of engine operation and tends to maintain a constant lubricant temperature and temperature of incoming air or fuel mixture. The radiator also is placed immediately adjacent the carburetor at that point where the liquid fuel mixes with the incoming air and becomes vaporized. Heat required to be supplied for the latent heat of vaporization is available in the heated lubricant and is absorbed therefrom, thus preventing material reduction of temperature of the incoming fuel mixture due to this required heat. This abstraction of heat to vaporize the fuel serves to materially cool the lubricant.

Referring more in detail to the figures of the drawings, I provide a body member 10 forming a chamber having openings in its upper and lower surfaces 11 and 12 respectively. This body member 10 is adapted to be attached upon its upper surface to a part of the intake 13 of an internal combustion engine. The carburetor 14 of the engine may be directly attached to the body member 10 upon its lower surface. Air entering the intake 13 therefore, after going through the carburetor 14, must pass through the body member 10 on its way to the intake conduit 13, a part only of which is shown.

Within this body member 10 is removably inserted a radiator 15 preferably and as shown of the multi-cellular type. Any other standard or usual radiator construction, however, may be employed. This radiator 15 is so formed and inserted within the body member 10 that the openings through its tubes 16 extend vertically or in the same direction in which the air passes through the radiator. The air or fuel mixture may therefore pass directly through these spaces during its passage to the intake without having its resistance to flow materially increased. The radiator is also made of sufficient size so that ample space is provided for the incoming air, and the radiator 15 and body member 10 closely fit each other about the periphery of the radiator so that all air or vapor passing through the body member 10 will be brought into intimate contact with the tubular wall 16 of the radiator 15.

If desired to aid in heating the incoming air by making use of the heat of the exhaust gases of the engine, a conduit 17 may be inserted to extend preferably horizontally through the body member 10. Through this conduit 17 all or a portion of the exhaust gases of the engine may be passed. Fins 18 provided circumferentially on the outside surface of this conduit 17 serve to aid in the transfer of heat from the exhaust gases to the incoming air. The conduit is usually employed only under those circumstances when the engine is subjected to extremely low temperatures. Under such circumstances the lubricant is less highly heated and therefore requires less cooling. Similarly, the incoming air is so much colder that additional heat is beneficial in vaporizing the fuel mixture. Any form of controlling means (not shown) for admitting or preventing admission of the exhaust gases to the conduit 17 may be employed.

The radiator 15 includes a shell 20 within which the tubes 16 are secured so that the space between the tubes 16 and between the tubes 16 and the shell 20 forms an enclosed space for the circulation of liquid about the tubes 16 and within the radiator. This radiator 15 in complete form may be inserted within the body member 10 through an opening in one of the sides thereof, this opening being closed by a suitable cover plate 21 through which may extend connections 22 and 23 for admitting and exhausting fluid to and from the space within the radiator 15. One of these connections 22 will communicate as by a tubing 24 suitably secured thereto by means not shown, with a part of the lubricant circulating system. One of the spaces 25 of this system is shown in Fig. 1 surrounding a part of the intake manifold 13. The other opening 23 may communicate with the oil sump (not shown). Before being returned to the sump and again circulated by the pump, the lubricant is cooled materially by its passage through the radiator 15.

As shown in the figures of the drawings, the radiator 15 has its walls distributed throughout the cross sectional area of the intake passages. They are therefore subjected to the influence of the entire volume of air or fuel mixture entering the engine.

In engines having a carburetor as shown, the radiator 15 and its body member 10 are positioned within the intake between the carburetor 14 and the combustion chamber of the engine. The heat required to change a liquid fuel into its gaseous form, that is the latent heat of vaporization, is abstracted from the circulating lubricant, thus cooling the lubricant and preventing material lowering of the temperature of the fuel mixture.

In starting or when for any other reason the lubricant is too viscous to circulate freely about the spaces within the radiator 15, it is desirable that the lubricant be allowed automatically to by-pass the space within the radiator. For that purpose the radiator is provided with a relief valve 26, the valve member being normally forced as by a spring 27 against its seat formed in the radiator frame or shell 20. With the valve 26 closed as shown in Fig. 2, lubricant entering the radiator through the connection 22 will traverse the spaces about the tubes 16 within the radiator 15 and be exhausted through the connection 23 on the opposite side of the valve 26. If, however, an increased pressure is built up within the enclosed space 20 for any reason, the valve 26 will be opened thereby and lubricant may then pass directly to the exhaust connection 23 through a passage 26ᵃ. By this means the radiator is protected against undue pressures and the lubricant is maintained in circulation within its system whether it traverses the radiator or is by-passed past the radiator.

I claim:

1. A lubricant cooling device for internal combustion engines comprising in combination, an intake conduit having an enlarged chamber formed therein, one of the sides thereof having an opening therein, a cover plate over said opening, a multi-cellular radiator removably attached to said intake and enclosed within said chamber through said opening, whereby the fuel mixture may pass therethrough, and connections to circulating spaces within said radiator extending through said cover plate, whereby lubricant may be circulated through said radiator closely adjacent said fuel mixture.

2. A lubricant cooling device for internal combustion engines comprising in combination, an intake conduit for admitting air thereto, a carburetor on said intake conduit, a multi-cellular radiator removably enclosed within said conduit between the engine and said carburetor and having passages therethrough extending in a direction parallel to the flow of air within said conduit, means to circulate lubricant within said radiator, connections therefor adjacent each other and on the same side of the radiator and means provided on said radiator and removable therewith to by-pass the lubricant past the circulating means within the radiator when the pressure therein exceeds a predetermined amount.

3. A liquid cooling device for internal combustion engines comprising in combination, an intake conduit having a carburetor thereon, a body member in said intake between the engine and said carburetor and having an enlarged chamber formed therein, one side of said chamber being open and provided with a cover plate, a multi-cellular radiator removably enclosed within said chamber through said opening and having circulating passages therein for a liquid, said radiator permitting passage of incoming fuel mixture therethrough, whereby said incoming mixture may be warmed and the liquid cooled during passage through said chamber, connections to said circulating passages within said radiator adjacent each other and on the same side of said radiator and a by-pass valve between said connections to provide circulating passages from one connection directly to the other when the pressure within the radiator exceeds a predetermined amount.

4. A lubricant cooling device for internal combustion engines comprising in combination, an intake conduit, a carburetor thereon, a body member disposed between said conduit and carburetor and having an enlarged chamber therein, said body member having an opening on one side, a cover plate for said opening, and a multi-cellular radiator removably enclosed within said body member, said radiator having passages for the circulation of lubricant therethrough, whereby lubricant circulating within said radiator will be subjected to the cooling effect of substantially the entire volume of fuel mixture, and connections to said passage within said radiator passing through said cover plate.

LEONARD S. HOBBS.